United States Patent [19]

Waruszewski, Jr.

[11] Patent Number: 5,086,396
[45] Date of Patent: Feb. 4, 1992

[54] APPARATUS AND METHOD FOR AN AIRCRAFT NAVIGATION SYSTEM HAVING IMPROVED MISSION MANAGEMENT AND SURVIVABILITY CAPABILITIES

[75] Inventor: Harry L. Waruszewski, Jr., Albuquerque, N. Mex.

[73] Assignee: Honeywell Inc., Minneapolis, Minn.

[21] Appl. No.: 657,275

[22] Filed: Feb. 19, 1991

Related U.S. Application Data

[63] Continuation of Ser. No. 305,805, Feb. 2, 1989, abandoned.

[51] Int. Cl.$^5$ .............................................. G06F 15/50
[52] U.S. Cl. .................................. 364/454; 364/456; 364/449; 364/460
[58] Field of Search ............... 364/448, 449, 443, 460, 364/454, 461; 340/990, 995

[56] References Cited

U.S. PATENT DOCUMENTS

| | | | |
|---|---|---|---|
| 4,063,073 | 12/1977 | Strayer | 364/439 |
| 4,224,669 | 9/1980 | Brame | 364/433 |
| 4,584,646 | 4/1986 | Chan et al. | 364/449 |
| 4,646,244 | 2/1987 | Bateman et al. | 364/461 |
| 4,675,823 | 6/1987 | Noland | 364/460 |
| 4,706,199 | 11/1987 | Guerin | 364/460 |
| 4,805,108 | 2/1989 | Feuerstein et al. | 364/433 |
| 4,896,154 | 1/1990 | Factor et al. | 340/995 |

OTHER PUBLICATIONS

Hostetler et al., "Nonlinear Filtering Techniques for Terrain-Aided Navigation," *IEEE Transactions on Automatic Control*, vol. AC-28, No. 3, Mar. 1983, pp. 315–323.
Fellerhoff, "Sitan Implementation in the Saint System," *IEEE* (CH2365-5/86/0000-0089), May 1985, pp. 89–95.
Boozer et al., "The AFTI/F-16 Terrain-Aided Navigation System," Proc. *IEEE* 1985 National Aerospace and Electronics Conference, May 1985, pp. 351–357 (0547-3578/85/0000-0351).
Baird, "Performance Analysis of Elevation Map Referenced Navigation Systems," pp. 14.6.1–14.6.7, *IEEE* (CH1839-0/83/0000-0064).
Bialecke et al., "A Digital Terrain Correlation System for Tactical Aircraft," pp. 14.1.1–14.1.5, *IEEE* (CH1839-0/83/0000-0059).

Author Unknown, "Electronic Pilot Passes Fight (Flight) Tests," Machine Design, May 21, 1987, pp. 12.
GEC Avionics (brochure), "Spartan, Terrain Referenced Navigation" (Date Unknown).
Kolcum, "Harris Corp. Offering Digital Map Generator for Airborne Operations," *Aviation Week & Space Technology*, Mar. 16, 1987, pp. 84–87.
Dale, "Terrain Profile Matching for Missile Guidance", pp. 17–19–Publication and date unknown.
Hostetler, "Optimal Terrain-Aided Navigation Systems," Presented at the *AIAA Guidance and Control Conference*, Aug. 1978, Palo Alto, California, SAND-78-0874C.

*Primary Examiner*—Thomas G. Black
*Attorney, Agent, or Firm*—Dale E. Jepsen; Don J. Lenkszus; Al Medved

[57] ABSTRACT

An aircraft navigation system is disclosed for use in missions involving unfamiliar terrain and/or terrain having hostile forces. The navigation system includes an inertial navigation system, a map of the terrain with elevational information stored in a digitized format as function of location, a typical energy managed or narrow (radar or laser) beam altimeter, a display system, and a central processing unit for processing data according to preselected programs. The data processing system includes an operational mode (software program) for relating the continuing sequence of altimeter readings with the changing aircraft position on the digitized map. In this manner, the true position of the aircraft can be determined with respect to the digitized map and can be displayed on a plan view of the map. When the correct position of the aircraft with respect to the digitized map is known, a display of the map and the aircraft can provide presentations useful to the navigation of the aircraft, e.g., by displaying surface features that can provide potential danger for the aircraft. The correct position of the aircraft with respect to the digitized map can permit the aircraft to engage in terrain following procedures using only the relatively difficult to detect altitude range finding apparatus as a source of emitted electromagnetic radiation. The navigation system, in conjunction with information regarding hostile antiaircraft facilities, can provide a display permitting an operator to determine a reduced risk flight path.

20 Claims, 6 Drawing Sheets

APPARATUS AND METHOD FOR AN AIRCRAFT NAVIGATION SYSTEM HAVING IMPROVED MISSION MANAGEMENT AND SURVIVABILITY CAPABILITIES

This is a continuation of copending application Ser. No. 07/305,805, filed Feb. 2, 1989, now abandoned.

BACKGROUND OF THE INVENTION

1. Field of the Invention

This invention relates generally to navigation systems used in aircraft and similar vehicles and, more particularly, to navigation systems that can be useful for an aircraft operating in hostile territory. The navigation system of the present invention is specifically designed to provide an operator with requisite data for decreasing risk from unfriendly activity in a manner permitting more attention to other aspects of the mission.

2. Description of the Related Art

In aircraft assigned missions over hostile terrain, the demands on the flight deck have become increasingly severe. The flight deck must monitor position and flight parameters while pursuing mission objectives. The mission objectives can include penetration of air space protected by hostile antiaircraft ordinance.

The aircraft position is typically monitored by an inertial navigation system. After calibration, the objective is to have the inertial navigation system provide the global coordinates (i.e., latitude and longitude parameters) of the current aircraft position. In the inertial navigation system, small systematic errors are typically present that can cause the current designated position to deviate from the actual position by an amount that increases with time. To remedy these errors, coordinates of known locations over which the aircraft passes are used to provide a correction to the position designated by the inertial navigation system.

More recently, maps of various portions of the globe have become available in which digitized terrain elevations are provided as a function of a grid of (latitude and longitude) locations. The availability of these digitized grid elevation maps has resulted, in; systems that can, based on measurement of the distance between the aircraft the terrain, correlate the position of the aircraft on the grid of the digitized map. These position locating systems generally rely on Kalman filters. For example, the SITAN (Sandia Inertial Terrain-Aided Navigation) system has been described in "Optimal Terrain-Aided Navigation Systems", by L. D. Hostetler, *AIAA Guidance and Control Conference*, Aug. 7-9, 1978 (SAND78-0874C); "Nonlinear Kalman Filtering Techniques for Terrain-Aided Navigation" by L. D. Hostetler and R. D. Andreas, *IEEE Trans. on Automatic Control*, Vol. AC-28, No. 3, March 1983, pages 315-323; "SITAN Implementation in the Saint System" by J. R. Fellerhoff, IEEE, 1985, (CH2365-5/86/0000-0089); and "The AFTI/F16 Terrain-Aided Navigation System", by D. D. Boozer, M. K. Lau and J. R. Fellerhoff, Proc. of the *IEEE* National Aerospace and Electronics Conference, May 20-24, 1985 (0547-3578/85/0000-0351). Other systems have been described in "Performance Analysis of Elevation Map Referenced Navigation Systems" by C. A. Baird, *IEEE*, 1983, (CH1839-0/83/0000-0064); "A Digital Terrain Correlation System for Tactical Aircraft" by E. P. Bialecke and R. C. Lewis, *IEEE*, 1983, (CH1839-0/83/0000-0059); and U.S. Pat. No. 4,584,646, issued Apr. 22, 1986, entitled "System for Correlation and Recognition of Terrain Elevation" and invented by L. C. Chan and F. B. Snyder.

In order to enhance the survivability of an aircraft entering hostile air space, several techniques to protect the aircraft and/or to minimize the risk of detection have been developed. Because target acquisition radar system is generally most effective for line of sight targets, a typical procedure has been to keep the aircraft as close to the ground as possible, attempting to interpose terrain features between the aircraft and the radar system. The target acquisition radar system can not then detect the intruding aircraft or can have difficulty separating the intruding aircraft from background noise. To permit an aircraft to fly as close to the ground surface as possible, terrain following (radiation) systems have been developed that, in response to emitted electromagnetic radiation, automatically maintain an aircraft a preselected distance from the ground. These terrain following systems have the disadvantage that the very electromagnetic radiation needed to guide the aircraft increases the detectability. A second technique used to enhance the survivability of an aircraft entering hostile air space is to equip an aircraft with electronic counter measures apparatus. The electronic counter measures apparatus disrupts the signal received by the detecting apparatus of the hostile target acquisition system so that the aircraft is not detected, so that false targets are detected, or so that maintaining a radiation "lock" on the aircraft is not possible. The electronic counter measures apparatus is expensive and is subject to rapid obsolescence as the technological advances provided reduce the effectiveness of currently implemented electronic countermeasures. A similar result can be achieved by an aircraft by releasing (electromagnetic radiation) reflecting chaff. The chaff typically provides a "bright" or dominant background as seen by the target acquisition system, obscuring the image of the aircraft. The aircraft can rapidly leave the area of the chaff becoming once again visible to the target acquisition system. In addition, signal processing of the returned electromagnetic radiation can remove the false background provided by the chaff. The aircraft can also be provided with electronic equipment that permit, when hostile antiaircraft apparatus has "acquired" or has "locked on" the intruding aircraft, the aircraft to engage in defensive maneuvers. Finally, a class of stealth aircraft are becoming operational that are configured to provide a reduced image for reflected electromagnetic radiation (as well as other aircraft detection techniques). These stealth aircraft have elaborate and costly concealment mechanisms that are impractical for reasons of cost to all but a small percentage of aircraft. Non-the-less, stealth aircraft can also benefit from low level and threat avoidance techniques by minimizing the opportunity for visual detection of the aircraft.

A need has therefore been felt for an aircraft navigation system that can not only permit guidance of the aircraft, but can support mission objectives over hostile terrain including support for response to known hostile antiaircraft installations and for covert low level flight. This support can take the form of displays using available data bases which simplify the decision process in the flight of the aircraft.

FEATURES OF THE INVENTION

It is an object of the present invention to provide an improved aircraft navigation system.

It is a feature of the present invention to provide an aircraft navigation system that uses known terrain features to locate a current aircraft position.

It is another feature of the present invention to provide an aircraft navigation system that permits terrain following and avoidance capability without widespread transmission of electromagnetic radiation.

It is a further feature of the present invention to use the digitized terrain map to assist an aircraft flight deck in execution of mission responsibilities.

It is yet a further feature of the present invention to use the terrain map to provide presentations to the flight deck assisting in identifying and responding to tactical situations.

It is yet another feature of the present invention to provide a navigation system that can provide the aircraft with reduced detectability by the target acquisition system of hostile forces.

It is still another feature of the present invention to use the digitized terrain map and aircraft altitude to provide threat terrain masking, intervisibility display to aid in the avoidance of detected positions threatening the aircraft.

SUMMARY OF THE INVENTION

The aforementioned and other features are attained, according to the present invention, by providing an aircraft navigation system with an inertial navigation system that can control the flight of an aircraft through terrain represented by a terrain map data base. The navigation system includes an altitude determining system which, once an initial location of the aircraft relative to the terrain map is determined, can be used to confirm and correct the position of the aircraft as determined by the inertial navigation system. The confirmation or correction of the aircraft position is the result of the comparison of the terrain map altitude of the changing position of the aircraft as determined by the inertial navigation system with the measured altitude. The position of the aircraft is displayed relative to the terrain map data base. In addition, the terrain map data base can be used to provide visual displays of terrain hazards to the aircraft and to provide visual presentations of threats to the aircraft that can permit the flight deck to select a safe flight path through the terrain hazards and associated threat locations associated with hostile forces.

These and other features of the present invention will be understood upon reading of the following description along with the drawings.

BRIEF DESCRIPTION OF THE DRAWINGS

FIG. 1A illustrates errors in position when using only an inertial navigation system; while

DESCRIPTION OF THE PREFERRED EMBODIMENT

1. Detailed Description of the Figures

Figure 1A:
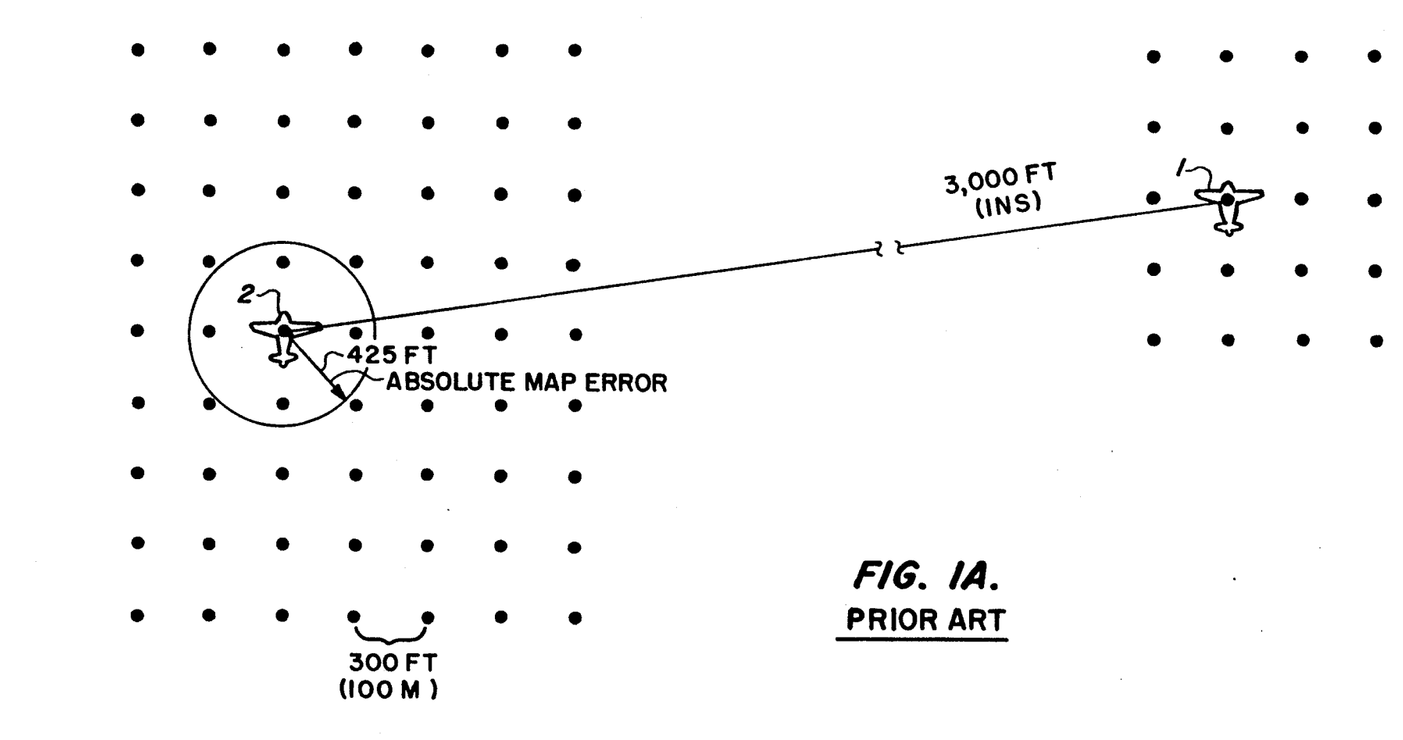

Referring now to FIG. 1A, the errors arising in the components due to the inertial navigation system of the present invention are shown. A grid with points containing digitized elevation data are placed 300 ft ($\approx 100$ meters for level 1 DLMS data) apart. (In the actual digitized terrain data base, the grid points are defined in terms of degrees of arc to compensate for the earth's curvature). The inertial ft. The aircraft is physically located at position 1, but can actually be reporting a location at position 2, 3,000 ft distance from position In addition, even when the coordinates of position 2 are accurately known (i.e., for example with GPS), the coordinates of the digitized map have an absolute error of ±425 ft. This absolute map position uncertainty is illustrated by the circle in FIG. 1A.

Figure 1B:
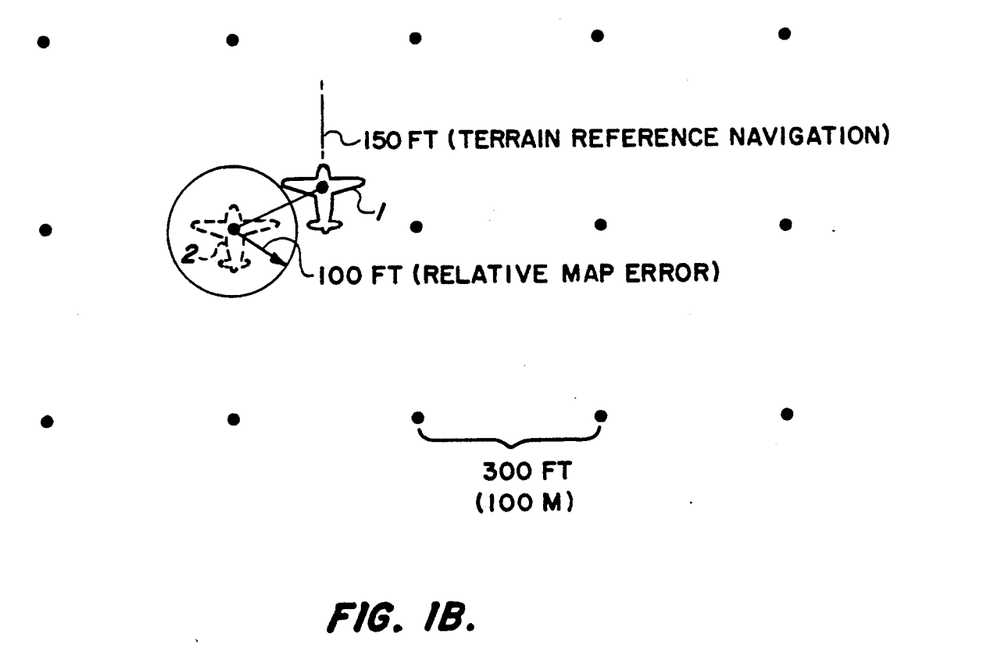
FIG. 1B illustrates the errors in position arising from terrain aided navigation system.

Referring to FIG. 1B, the errors in position when terrain aided navigation is used are illustrated. The apparatus processing the (radar or laser) altimeter information and providing position data is accurate to ±150 ft for moderately rough terrain. Therefore, the aircraft physically located at position 1 can actually be reporting a location at position 2 with respect to the coordinates of the digitized map. Even when the coordinates of position 2 with respect to the map are accurately known, the coordinates have a relative accuracy in position of ±100 ft. This relative uncertainty in position of the aircraft is illustrated by the circle in FIG. 1B. By comparing FIG. 1A and FIG. 1B, the improvement of the accuracy is clearly illustrated. Part of the improvement in accuracy is a result of not using the absolute position coordinates based on latitude and longitude to position the aircraft, but rather using position relative, to the coordinates of the digitized map derived from terrain reference navigation. When the presentations described below are presented to the flight deck, the errors from the inertial navigation system, i.e., ±425 ft plus the actual inertial navigation system error (potentially more than 3,000 ft.) compared to errors in the terrain aided navigation system, i.e., ±100, plus the actual terrain aided navigation system (±150 ft) indicate the substantial improvement in accuracy for decision making in the terrain aided navigation mode of operation.

Figure 2:
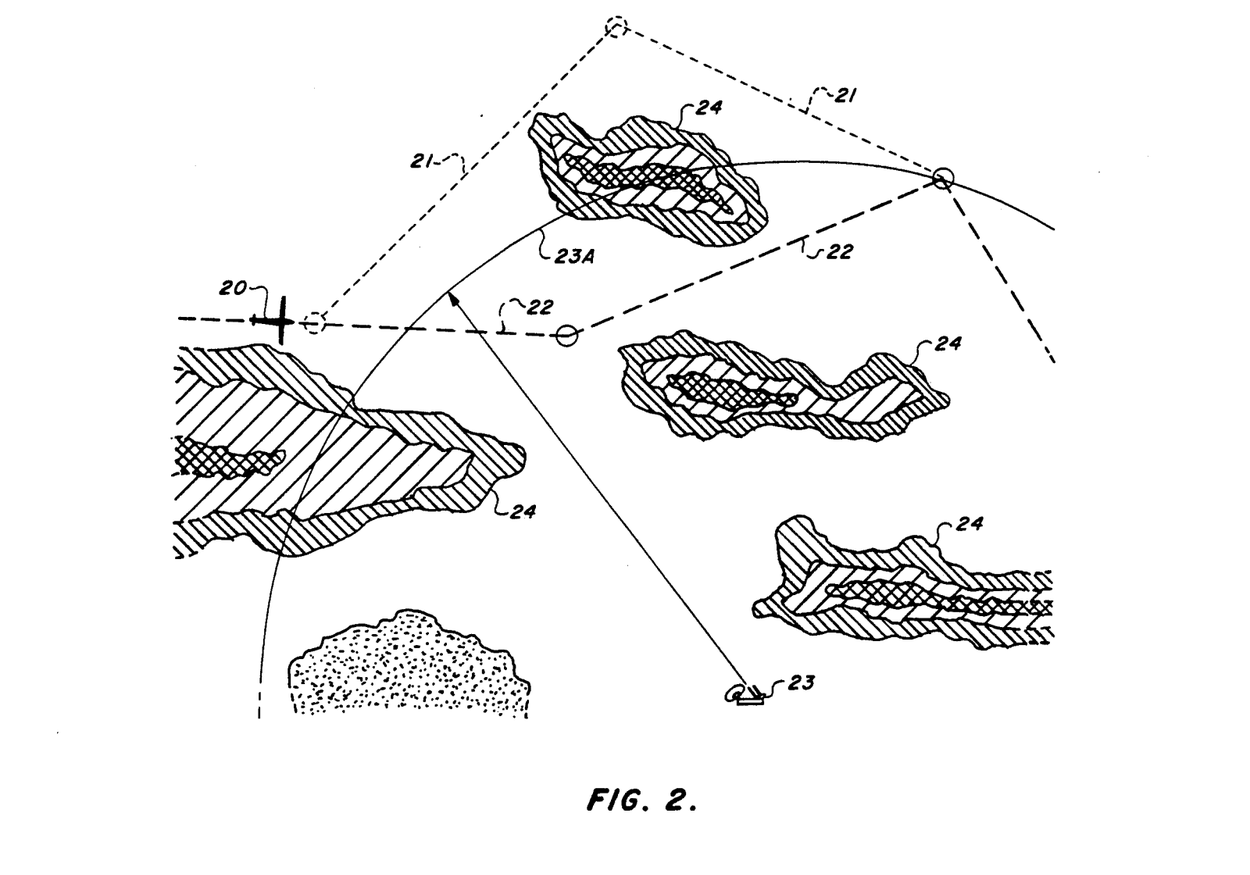
FIG. 2 illustrates a tactical situation display plan view of an aircraft flight plan.

Referring next to FIG. 2, a tactical situation in a plan view map is shown. The map illustrates the terrain features 24 with contours of constant elevation. The position of the aircraft 20 and alternate flight paths 21 and 22 are shown relative to the terrain. A antiaircraft installation 23 is shown and the circumference 23A illustrating the effective operational limits of the antiaircraft installation is designated. For purposes of clarity, the terrain structure is designated by contours of constant elevation. For purposes of illustration, relatively few contours are shown, however, the density of contours of constant elevation can be increased. In the preferred embodiment, instead of elevation definition by contours, the terrain is defined by sun angle shadowing on a color display. Indeed, a plurality of colors can be used to assist in the recognition of terrain features. Intensity levels or region texturing can be used in lieu of colors to designate characteristics of regions.

Figure 3:
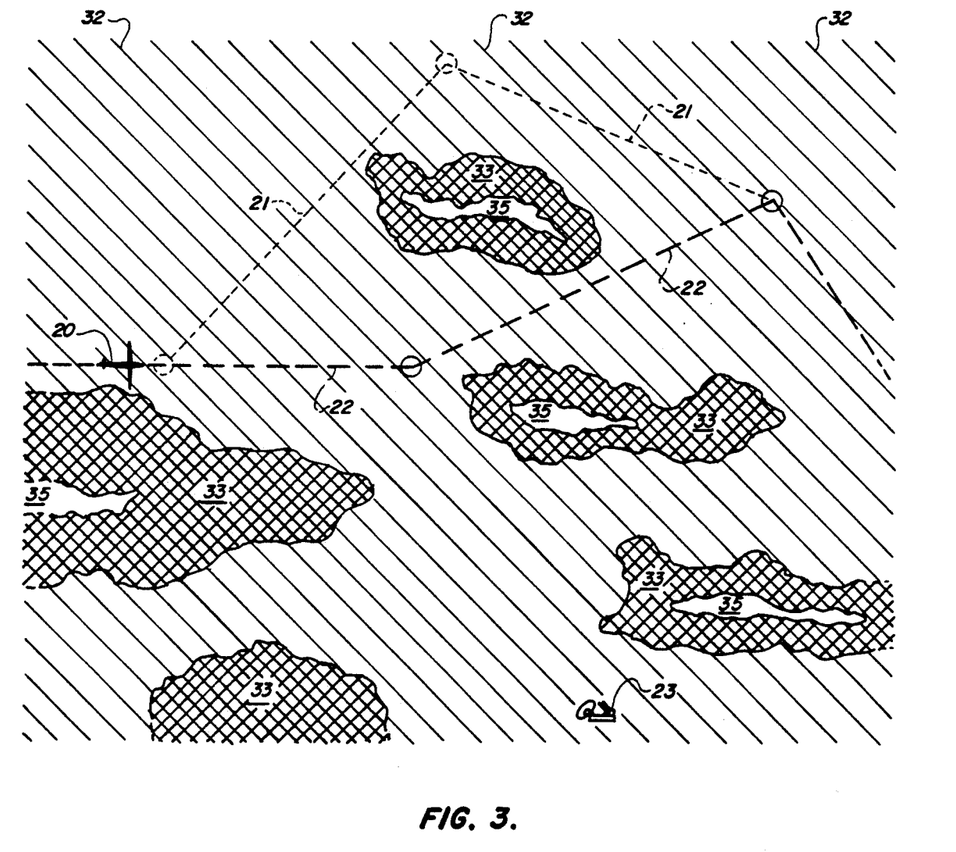
FIG. 3 illustrates a quantized elevational situation display.

Referring to FIG. 3, a further refinement in the tactical situation display is illustrated. In this multicolor display (wherein the different colors are illustrated by different patterns in separated regions), three colors are used to alert the flight deck to the relationship of the aircraft to the terrain. The color of the first group of regions 32 designates to the flight deck that the associated terrain is safely below the aircraft and collision with the terrain at the present aircraft altitude is not possible. The color of the second group of regions 33 is a visual designation that, give the errors in the terrain maps and the margin of errors, there is a risk of collision with the terrain in these regions. The color of the third group of regions 35 is visual designation to the flight deck that entry of the aircraft 20 into those regions will result in a terrain collision.

Figure 4:
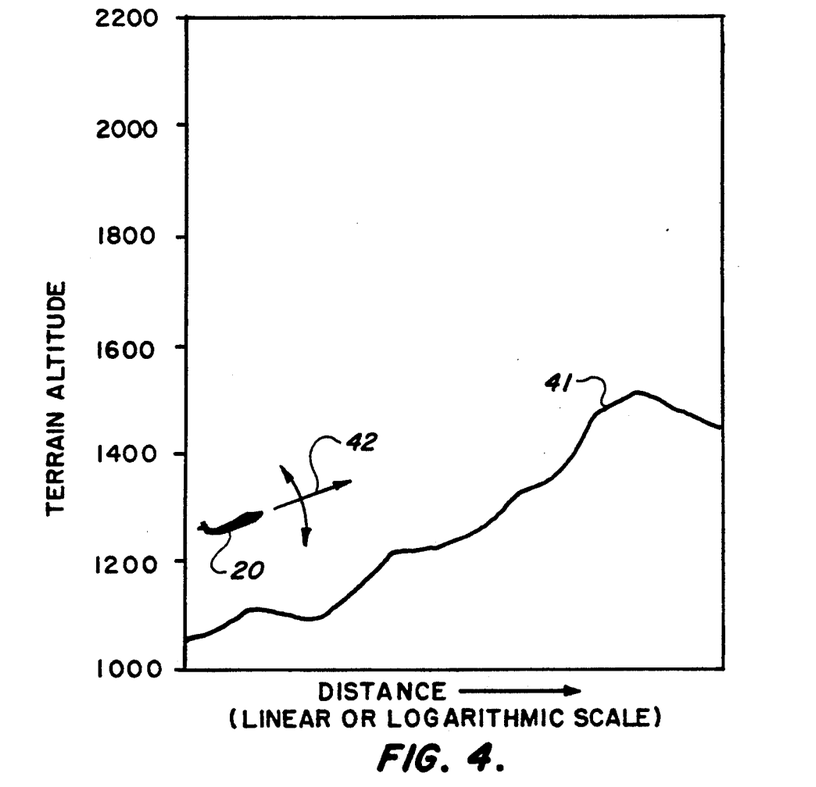
FIG. 4 is a terrain elevation profile map for present aircraft flight path.

Referring next to FIG. 4, a display with a terrain profile map, determined by the position of aircraft 20, is illustrated. This display provides the following information. The aircraft icon 20 has associated therewith a climb/dive indicator 42 which designates the current altitude change relative to the horizontal direction. In addition, the display shows the distance between the aircraft 20 and the terrain directly below the aircraft. (In the preferred embodiment, a linear scale or a logarithmic scale can be selected for the horizontal coordinate). Finally, the display provides the flight deck with the profile of the terrain in the current flight path of the aircraft relative to the present altitude of the aircraft 20.

Figure 5:
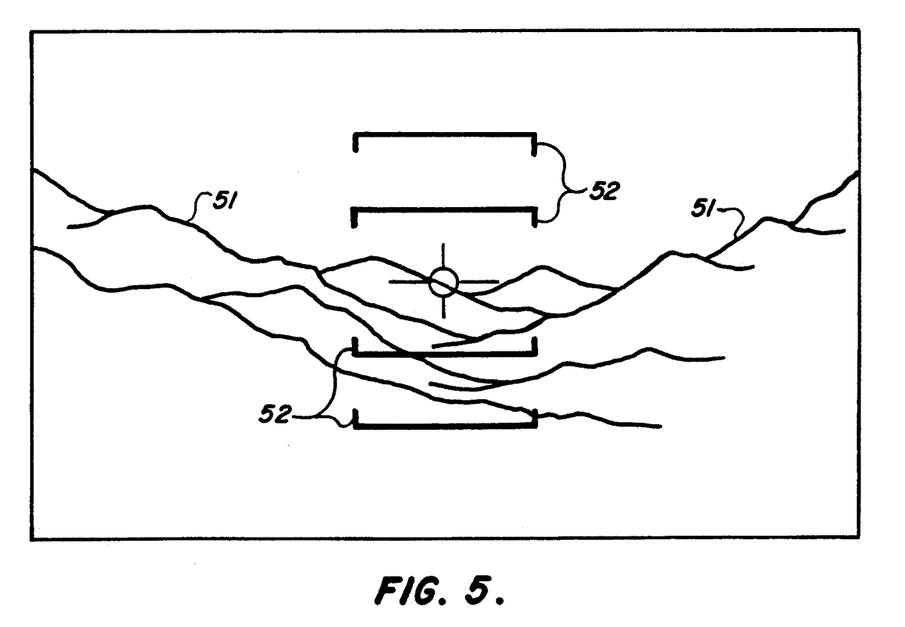
FIG. 5 is a full perspective display of the terrain in advance of the aircraft flight path.

Referring to FIG. 5, a display of the terrain in front of the aircraft's current flight path is shown. The display illustrated in FIG. 5 contains only ridge lines 51. Aircraft orientation markings are included to assist the flight deck in identifying the terrain features relative to the aircraft. The ridge line display is particularly well suited for a head's up display (HUD) to assist the flight deck in correlating the terrain map with the visible terrain features. The display of FIG. 5 can, when used in a color display, be implemented with colors with shading and with a plurality of colors to provide more complete information of the forward terrain to the flight deck.

Figure 6:
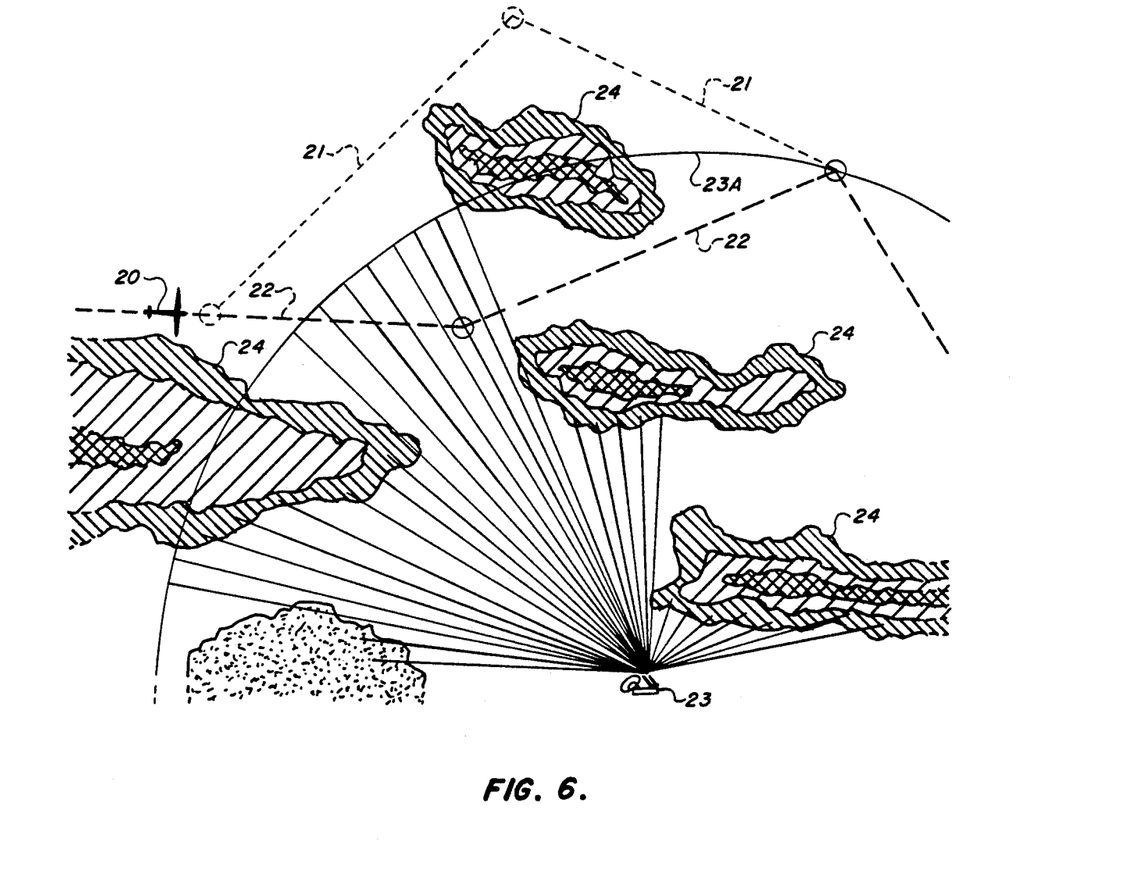
FIG. 6 is an intervisibility or threat, display for antiaircraft weapons associated with hostile force.

Referring next to FIG. 6, the terrain map of FIG. 2 is repeated with a threat overlay. The antiaircraft installation 23 can typically acquire a target and project ordinance at the target (within the installation range 23A) for line-of-sight targets. Therefore, intervening terrain structures 24 can screen the aircraft from the antiaircraft installation. The display illustrated by FIG. 6 is provided to inform the pilot of the danger from the antiaircraft installation if the present altitude and flight path 22 is maintained. In this instance, a new route 21 can be planned, either manually or automatically, to minimize detection and threats to the aircraft, thereby reducing mission risks.

2. Operation of the Preferred Embodiment

In the missions currently assigned to aircraft, the attention of the flight deck must be directed to a multiplicity of situational aspects of the mission. The present position of the aircraft, the destination of the aircraft, the flight path from the present position to the destination, risks resulting from enemy armament, in addition to the status and operational characteristics of the aircraft, must be monitored by the flight deck. As will be clear, the amount of information to which the pilot must respond is so large that attempts have been made to provide the information in an easily comprehendible format.

In the present invention, the digitized terrain map is used as the basis for providing displays for which interpretation is relatively convenient. Because the displays are generated in relation to the digitized terrain map (and not the inertial navigation system), the accuracy of the relative location of the terrain map features and the aircraft is correspondingly increased. The increase in accuracy reduces the risk to the aircraft. The relatively simple aircraft/terrain display illustrated by FIG. 2 is provided by simply overlaying the aircraft icon on the terrain map in a position determined by one of the position determining algorithms identified above. (Note that the shadowing algorithms for providing a more physically realistic display are well known to those skilled in the art of displays). The relational aircraft/terrain displays of FIG. 3 and FIG. 4, for example, provide a readily interpretable indication of the risks involving terrain features. These displays are the result of processing the digitized terrain map and the sensors of the aircraft. The threat display of FIG. 6 permits the flight deck to respond to known hostile installations and to pop-up threats (such as a newly positioned mobile SAM installation). In this display, the location of the hostile forces, antiaircraft installations can be incorporated in a separate data base, and during signal processing, combined with the digitized terrain map data. The forward display of FIG. 5 can assist the flight deck in maneuvering among terrain features and uses the information of the digitized terrain map in combination with the parameters of the aircraft determined from the aircraft sensors.

As will be familiar to those skilled in the art, data bases are also available that provide positional information relative to potential aircraft obstructions, i.e., antenna, smokestacks, buildings, etc. These data bases can be incorporated into the display to alert the flight deck of the presence of obstructions not defined by the terrain map. Indeed, some data bases can define seasonal differences in the signature of the terrain altitude.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A navigation system for use in aircraft, said navigation system comprising:
   an inertial navigation system;
   a data base including a terrain map with digitized terrain elevations as a functions of global coordinates;
   a directional distance apparatus measuring a distance between an aircraft and terrain over which said aircraft is flying;
   processor means responsive to said inertial navigation system and to said terrain map for determining an approximate position of said aircraft relative to said terrain map, said processor means responsive to terrain map profiles of said terrain map in said approximate position of said aircraft relative to said terrain map and to terrain profiles measures by said directional distance apparatus for identifying a current position of said aircraft relative to said terrain map, said processor means identifying selected features of said terrain map which have a predetermined relationship with said aircraft; and a monitor unit responsive to said processor means for displaying said current position of an aircraft relative to a portion of said terrain map, said monitor means displaying said selected features located on said terrain map portion.

2. The navigation system of claim 1 wherein said processor means processes said digitized terrain map to provide a profile view of terrain in a flight path of said aircraft as viewed from a position of said aircraft icon on said terrain map, said profile view being displayed on said monitor unit.

3. The navigation system of claim 1 wherein said monitor unit provides a display selected from the group of displays consisting of a profile of terrain contours visible from the flight deck of said aircraft, each display of said group of displays being provided by said processor means in response to said digitized terrain map and a position of said aircraft relative to said digitized terrain map.

4. The navigation system of claim 1 wherein said monitor unit displays threats from antiaircraft installations for a current altitude of said aircraft for a position of said aircraft relative to said digitized terrain map, a display of said threats being determined by said processing means.

5. The navigation system of claim 4 wherein said monitor unit provides an intervisibility display of threats to said aircraft from known hostile installation relative to said aircraft icon, said intervisibility display including terrain masking for said current altitude of said aircraft.

6. The navigation system of claim 5 wherein a first color designates terrain structures having an altitude as high or higher than a current altitude of said aircraft.

7. The navigation system of claim 1 wherein said monitor unit displays threats to a flight path on said terrain map relative to said aircraft icon in a plurality of colors, each of said colors identifying a parameter of threats relative to said aircraft.

8. The navigation system of claim 1 wherein said processor means includes means for providing sum angle shadowing on a terrain map displayed by said monitor unit.

9. The method of assisting navigation of an aircraft on a mission, said method comprising the steps of:
  by means of navigational equipment, identifying an approximate position of said aircraft relative to a terrain map, said terrain map having at least digitized terrain elevations stored as a functions of global coordinates;
  comparing terrain profiles determined by measurements of a distance of said aircraft from terrain over which said aircraft is flying with terrain map profiles to determine a position of said aircraft relative to said terrain map;
  displaying a presentation of a local region of said terrain map with an icon of said aircraft positioned on said presentation in said position of said aircraft relative to said terrain map; and
  implementing said presentation to provide a visual indication of terrain map features which currently provide a threat to aircraft security.

10. The method of assisting navigation of claim 9 wherein said comparing and said displaying steps reduce uncertainties in a position of said aircraft relative to features of said digitized terrain map resulting from global coordinate identification of said aircraft position and global coordinate identification of said terrain map feature positions.

11. The method of assisting navigation of claim 10 wherein said implementing step includes a step of providing said presentation with a visual indication of regions of safety from antiaircraft armament relative to a current position of said aircraft.

12. The method of assisting navigation of claim 10 wherein said implementing step includes a step of providing said presentation with a visual indication of a profile view of terrain features in a flight path of said aircraft relative to a current position of said aircraft.

13. The method of assisting navigation of claim 10 wherein said implementing step includes a step of providing said presentation with a visual indication of terrain features in front of said aircraft as viewed from a flight deck of said aircraft.

14. The method of assisting navigation of claim 10 wherein said implementing step includes a step of providing said presentation with a visual geographical features providing a threat to said aircraft as a result of present flight parameters of said aircraft.

15. A navigation system for assisting operators of an aircraft in executing complex mission objectives in hostile territory, said navigation system comprising:
  an aircraft-to-terrain distance measuring device;
  a terrain map storing digitized terrain elevation data as a function of terrain map coordinates, said terrain map including threats to said aircraft;
  a terrain aided navigation system coupled to said distance measuring device and to said terrain map for determining a position of said aircraft relative to said terrain map coordinates by comparing terrain profiles measured by said aircraft-to-terrain distance measuring device to terrain profiles of said terrain map; and
  a display unit coupled to said terrain aided navigation system and to said terrain map for displaying an icon of said aircraft on a presentation of a region of said terrain map, an icon location being determined by said terrain aided navigation system, said presentation including visual indications of threats to said aircraft in a neighborhood of a flight path of said aircraft.

16. The navigation system of claim 15 wherein said presentation includes a location of at least one antiaircraft installation, said presentation providing a visual presentation of regions wherein said antiaircraft installation threatens said aircraft when said aircraft is flying at an altitude of said aircraft using said navigation system.

17. The navigation system of claim 15 wherein said presentation includes a profile view of terrain features in a flight path of said aircraft relative to a current position of said aircraft.

18. The navigation system of claim 15 wherein said presentation includes a view of terrain features in front of said aircraft as viewed from a flight deck of said aircraft.

19. The navigation system of claim 15 wherein said terrain aided navigation system used with said terrain map reduces an uncertainty in a position of said aircraft relative to said threats resulting from a use of global coordinates to identify positions of said threats and said aircraft.

20. The navigation system of claim 15 wherein said presentation includes sun angle shadowing of terrain features.

* * * * *